United States Patent [19]

Tracy et al.

[11] Patent Number: 4,640,618
[45] Date of Patent: Feb. 3, 1987

[54] PHASE CONJUGATE RELATIVE POSITION SENSOR

[75] Inventors: John M. Tracy; Pochi A. Yeh, both of Thousand Oaks; Mohsen Khoshnevisan, Newbury Park, all of Calif.

[73] Assignee: Rockwell International Corporation, El Segundo, Calif.

[21] Appl. No.: 548,585

[22] Filed: Nov. 3, 1983

[51] Int. Cl.[4] .......................... G01J 3/36; G01J 13/00; G01J 15/00
[52] U.S. Cl. .................................. 356/345; 356/28.5
[58] Field of Search .................. 356/5, 28.5, 350, 4.5; 330/4.3; 332/7.51

[56] References Cited

U.S. PATENT DOCUMENTS

| | | | |
|---|---|---|---|
| 3,639,029 | 2/1972 | Haines | 350/3.5 |
| 4,005,935 | 2/1977 | Wang | 356/5 |
| 4,215,936 | 8/1980 | Winocur | 356/5 |
| 4,233,571 | 11/1980 | Wang et al. | 331/94.5 |
| 4,280,764 | 7/1981 | Sica, Jr. et al. | 356/35.5 |
| 4,321,550 | 3/1982 | Evtuhov | 330/4.3 |
| 4,344,042 | 8/1982 | Hon | 330/4.3 |

OTHER PUBLICATIONS

Giuliano, Applications of Optical Phase Conjugation, Physics Today, p. 27 (Apr. 1981).
Yariv, Phase Conjugate Optics and Real-Time Holography, IEEE J. Quantum Elect., vol. 14, p. 650 (1978).

Primary Examiner—Davis L. Willis
Assistant Examiner—S. A. Turner
Attorney, Agent, or Firm—H. Fredrick Hamann; Craig O. Malin; John J. Deinken

[57] ABSTRACT

A relative position sensor is suitable for inertial navigation situations in which deviations from a predetermined position schedule are detected. A standing wave is established between a pair of opposed phase conjugate reflectors in a resonating cavity, and relative movement between the standing wave and the cavity is sensed. Since the standing wave continues to travel at its initial velocity regardless of deviations from that velocity by the resonator, deviations in the position of the resonator relative to its projected position based on the initial velocity can be measured. In a preferred embodiment, four-wave mixers are used as the phase conjugate reflectors, the phase conjugate medium within the mixers is made coextensive with the wave propagation medium between the mixers, and relative movement is sensed by monitoring the intensity of the standing wave at at least one location which is fixed relative to the resonator.

15 Claims, 6 Drawing Figures ic phenomenon that has attracted considerable attention in recent years. Several different ways of producing phase conjugated beams have been discussed in the literature, including four-wave mixing, stimulated Brillouin scattering, three-wave mixing and photon echo devices. A review of various applications of optical phase conjugation is presented by Giuliano in PHYSICS TODAY, April 1981, pages 27-35, "Applications of Optical Phase Conjugation". A general review of the field is given in A. Yariv, IEEE, J. Quantum Electronics QE14, 650 (1978).

PHASE CONJUGATE RELATIVE POSITION SENSOR

BACKGROUND OF THE INVENTION

This invention relates to devices for measuring the relative position of a moving frame of reference, and more particularly to an optically phase conjugated light system which may be used as a relative position sensor.

The measurement of changes in the relative position of a closed system such as an aircraft has posed a challenge in the past, since the ground cannot be used as a direct reference to obtain position updates. A common approach has been to provide an accelerometer, which detects any positive or negative acceleration of the body, and to integrate the measured acceleration values to obtain velocity and position information.

The accelerometers generally used are electromechanical transducers which produce a voltage proportional to, and in synchronism with, the time rate of change of the velocity of a body. One common form of accelerometer, for example, employs a piezoelectric ceramic-disc array provided with plated metallic surfaces cemented between a small mass and a base. The base is secured to the body whose acceleration is being measured, and the acceleration of the body causes a force to be applied by the mass to the ceramic-disc array. This force produces an output voltage between the plated metallic surfaces which provides an indication of the body's acceleration.

While the above type of relative position sensor has generally been satisfactory, it would be desirable to eliminate some of the mechanical aspects of the accelerometer device in order to increase the accuracy and sensitivity of the relative position sensor. It would also be desirable to measure relative position changes directly, rather than by twice integrating an acceleration signal.

SUMMARY OF THE INVENTION

It is an object of the present invention to provide a device which is capable of measuring the relative position changes of a moving body in a highly accurate and reliable manner. Another object is the provision of a relative position sensor whose operating mechanism is based upon the generation and detection of electromagnetic waves, rather than on movements of mechanical devices, and which is capable of measuring relative position changes more directly than with prior art accelerometers.

In the realization of these and other objects, an optical resonator is used to establish a standing electromagnetic wave between opposed phase conjugate reflectors. It has been discovered that a moving phase conjugate reflector does not Doppler shift the frequency of reflected light. It has been further discovered that, as a result of this Doppler-free reflection property, a standing wave in such a resonator will continue to move at the initial velocity of the body containing the resonator, despite changes in the velocity of the body after the standing wave has been established. Thus, any subsequent velocity changes will be detected as a change in the position of the resonator relative to the standing wave. The present invention utilizes this phenomenon to measure the deviation in the position of the body from what its position would have been had it continued to move at its initial velocity. Therefore, the phase conjugate sensor of this invention can measure the position of the observation platform containing the sensor with respect to the inertial frame of reference in which the resonator was initialized. Since the standing waves initiated in the reference frame appear as running waves in the moving observation platform, the running fringes can thus be counted to reveal the position of the platform with respect to the initial reference frame. So long as the initial standing waves set up between the phase conjugate mirrors are maintained, an observer on the observation platform need not contact external references for determining his position, because the fringes are directly tied to the initial frame of reference.

In a preferred embodiment such relative position changes are sensed by monitoring the intensity of the standing wave at a position which is fixed relative to the resonator. The resonator's phase conjugate reflectors preferably employ four-wave mixers and, in order to minimize local loss mechanisms, the phase conjugate medium within the mixers is made coextensive with the wave propagation medium between the mixers.

DESCRIPTION OF THE DRAWINGS

Further objects and advantages of the present invention will be apparent to those skilled in the art from the following detailed description, together with the accompanying drawings, in which.

DESCRIPTION OF THE INVENTION

Phase conjugation is an optical phenomenon that has attracted considerable attention in recent years. Several different ways of producing phase conjugated beams have been discussed in the literature, including four-wave mixing, stimulated Brillouin scattering, three-wave mixing and photon echo devices. A review of various applications of optical phase conjugation is presented by Giuliano in PHYSICS TODAY, April 1981, pages 27-35, "Applications of Optical Phase Conjugation". A general review of the field is given in A. Yariv, IEEE, J. Quantum Electronics QE14, 650 (1978).

Figure 1:
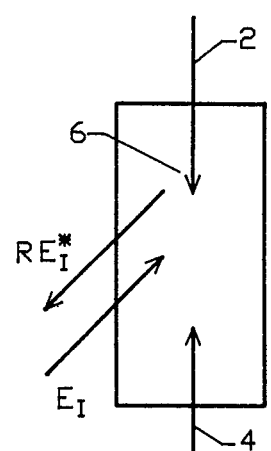
FIG. 1 is a simplified diagram of a phase conjugate four-wave mixer.

Basically, a phase conjugate reflector produces a phase reversed, oppositely directed reflection of an incident beam. A typical phase conjugate reflector known in the prior art is shown in FIG. 1. This is a four-wave mixer, in which a pair of contradirectional laser beams 2 and 4 are directed into a nonlinear medium 6. An initializing laser beam $E_I$, equal in frequency to beams 2 and 4, is directed into the medium from the side. As a result of the action of the various beams within the mixing medium, a reflected beam of amplitude $RE_I^*$ where R is the reflection coefficient, is reflected back in a direction opposite to incident beam $E_I$.

Since power is pumped into the system by beams 2 and 4, the reflector may produce an amplification which makes IRI greater than 1.

Figure 2:
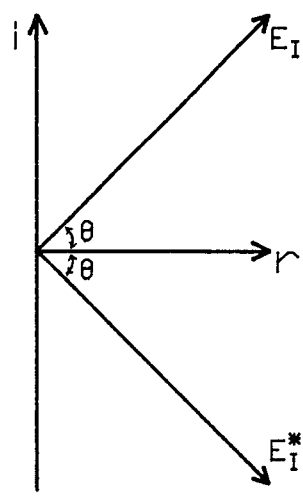
FIG. 2 is a phase diagram showing incident and reflected phase conjugate wavevectors.

In addition to being retroreflective to the incident beam, the phase conjugated reflected beam also undergoes a phase reversal with respect to the incident beam at the point of reflection. This is illustrated in the phase diagram of FIG. 2, which depicts the incident and reflected waves as vectors plotted with a horizontal real axis and a vertical imaginary axis. It may be seen that the phase angle of the reflected beam $RE_I^*$ is equal in absolute magnitude but reversed in polarity from the incident beam $E_I$.

Figure 3:
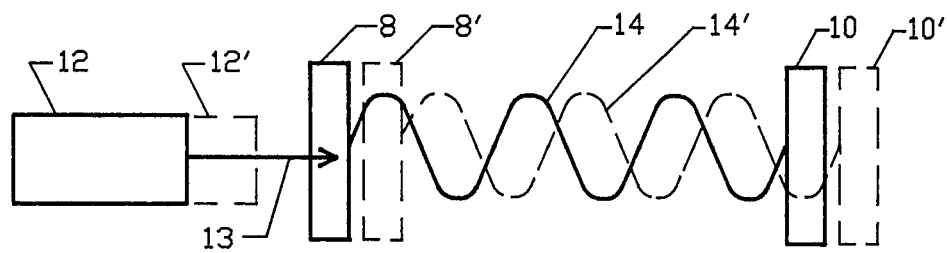
FIG. 3 is a diagram of a standing optical wave established between two conventional mirrors.

The present invention makes use of a phenomenon of phase conjugate waves which the inventors have discovered. This phenomenon may be best understood by first observing the nature of a standing optical wave established between two ordinary mirrors, as illustrated in FIG. 3. Ordinary mirrors 8 and 10 are positioned opposite and parallel to each other so that a light beam perpendicular to the mirros will be reflected back and forth between the pair. Assuming that mirror 8 is partially transmissive so that it will transmit light directed onto its left side but will reflect light directed onto its right side, a laser 12 to the left of the mirror may be used to establish a light beam 13 which is reflected back and forth between the two mirrors. If the frequency of the beam is properly correlated to the distance between the mirrors, a standing wave 14 will be established between the mirrors. If the mirrors are now each moved an equal distance to the right to new positions 8' and 10', the standing wave will move by a similar amount to position 14', indicating that the standing wave is spatially fixed relative to the mirrors.

Figure 4:
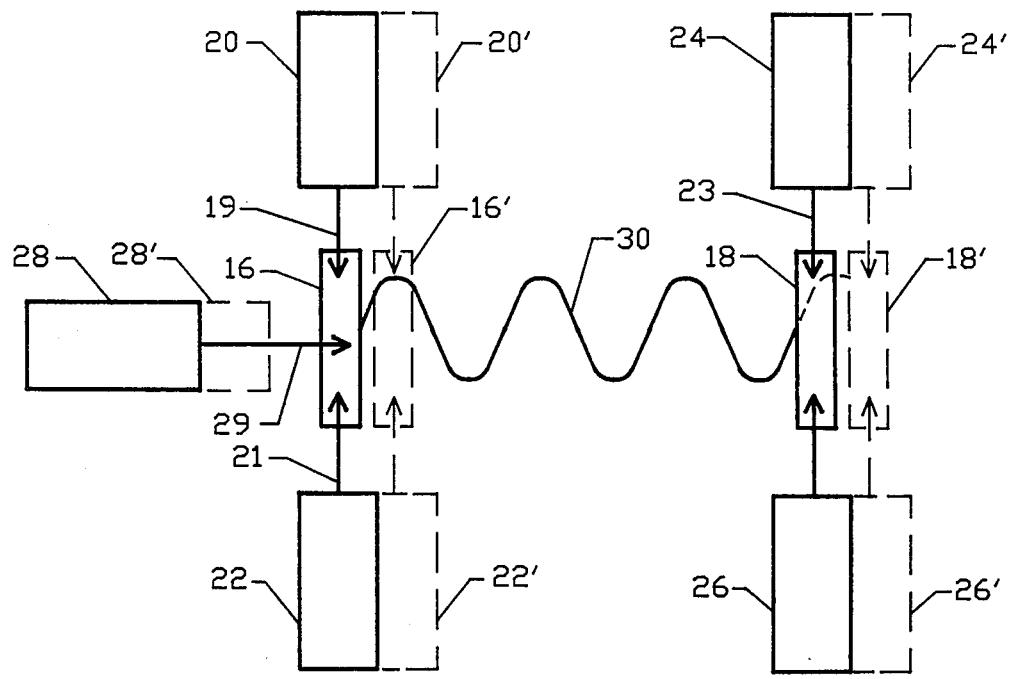
FIG. 4 is a diagram of a standing optical wave established between a pair of phase conjugate reflectors.

It has been observed that the response of a standing electromagnetic wave to a movement of its resonating cavity is distinctly different when the cavity is bounded by a pair of phase conjugate reflectors, rather than conventional mirrors. This situation is illustrated in FIG. 4, in which a pair of four-wave mixers 16 and 18 define the ends of a resonating cavity. The mixer 16 includes a non-linear medium into which contradirectional beams 19 and 21 from lasers 20 and 22 are directed, while mixer 18 comprises a similar non-linear medium into which contradirectional beams 23 and 25, from lasers 24 and 26, are directed (in principle, all the laser beams 20, 22, 24, and 26 could be derived from a single laser). A laser 28 located outside of the resonating cavity directs a beam 29 through the reflector 16 and toward the reflector 18. Assuming the beam frequencies are matched to the distance between the reflectors, as for FIG. 3, a standing wave 30 similar to the standing wave 14 of FIG. 3 will be established. Once the standing wave has been initiated, laser 28 may be turned off and the beam 30 will continue to propagate so long as the energy inputs from lasers 20, 22, 24 and 26 are sufficient to overcome any system losses.

As long as the resonating cavity of FIG. 4 continues to move at the velocity with which it was travelling when the standing wave 30 was initiated, the position of the standing wave relative to the resonator will remain unchanged, regardless of whether the initial velocity of the resonator was zero or non-zero. Moreover, the inventors have discovered that the standing wave pattern continues to travel at the initial velocity even if the velocity of the resonating cavity is altered. This phenomenon is illustrated in FIG. 4 by the four-wave mixers and associated lasers having moved to the right to positions 16', 18', 20', 22', 24' and 26', all indicated by dashed lines. While the resonator cavity has thus moved to the right, the standing wave 30 retains its original position, resulting in a relative position shift between the standing wave and the resonator. This lateral shift may be detected to provide an indication of the movement of the resonator relative to its scheduled position had it continued to move at its original velocity. The phenomenon is the same if the standing wave is initiated with the resonator moving at a non-zero velocity; any deviations from that velocity will produce a relative movement between the resonator and the standing wave.

Since there is no Doppler shift of the retroreflected phase conjugated waves at the initial resonator velocity, an observer located in a moving frame of reference which includes the resonator can observe motion of the standing wave relative to the resonator and can thereby directly measure the distance traveled by the resonator relative to its initially scheduled position. This is in contrast to the standing wave established between the conventional mirrors illustrated in FIG. 3, in which the standing wave appears unchanged to an observer in the moving frame of reference so long as the resonator is fixed to the reference frame. Thus, a resonator with conventional mirrors cannot be used to detect deviations from a predetermined position schedule.

Figure 5:
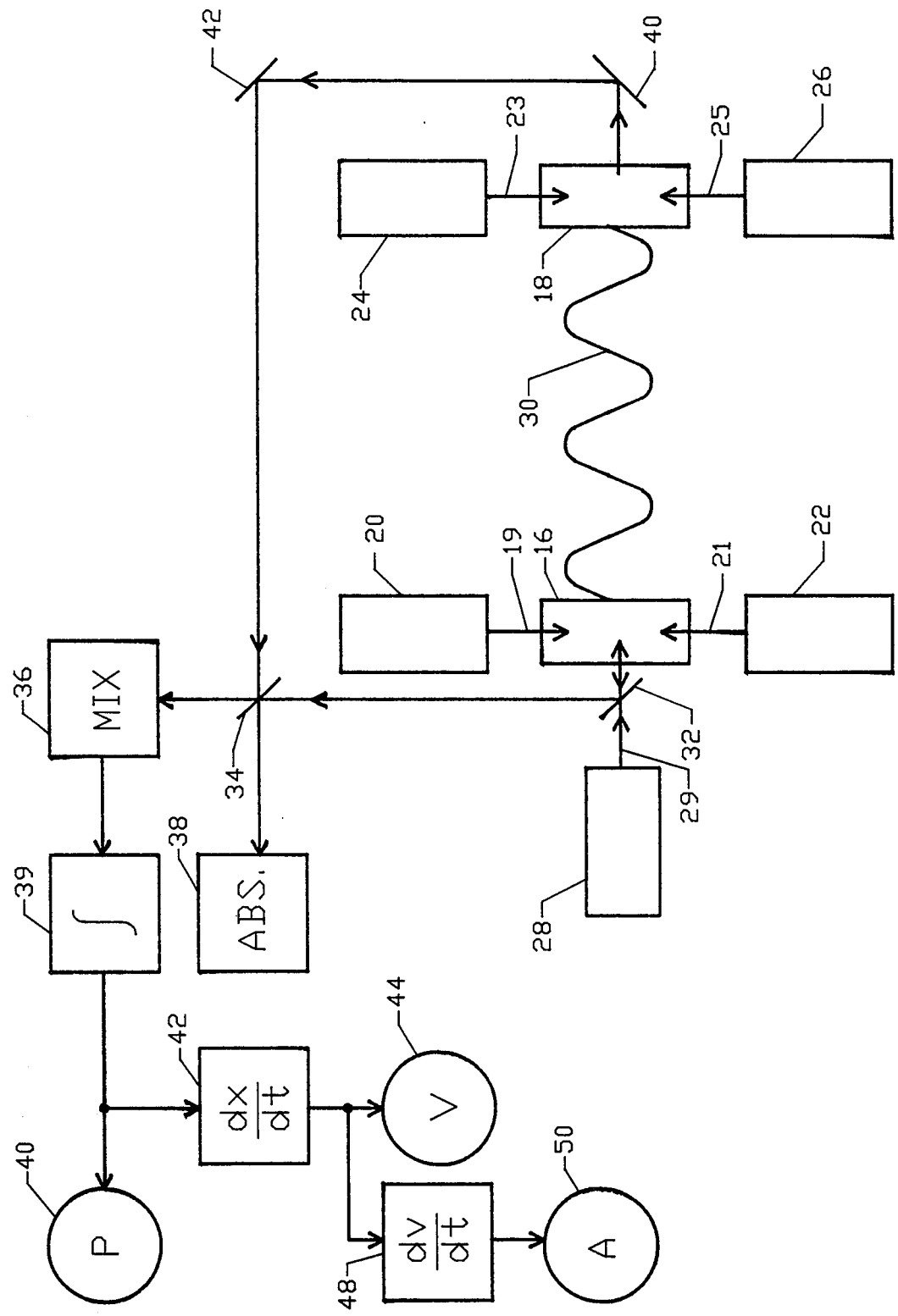
FIG. 5 is a schematic diagram of one form of phase conjugate resonator and associated detecting apparatus for measuring relative position changes in accordance with the invention.

The application of this phenomenon to a relative position sensor is shown in FIG. 5. The same type of phase conjugate resonator cavity as illustrated in FIG. 4 is here employed, with corresponding elements being identified by the same reference numerals. The gain of each phase conjugate reflector should be greater than unity in order to ensure self-sustaining oscillations and the continuation of the standing wave after the initiating laser 28 is turned off. In addition to reflecting the beam within the resonator, each reflector 16, 18 also transmits a portion of the incident beam. The beam emerging from the left hand mixer 16 is directed by a beam splitter 32 to a beam splitter 34, which directs a portion of the beam to a mixer 36 and the remainder to an excess beam absorber 38. Similarly, the beam emerging from the four-wave mixer 18 is directed by mirrors 40 and 42 to the beam splitter 34, and thereby to the mixer 36 and the absorber 38.

The mixer 36 mixes the two output beams and detects their combined intensity. This detected intensity varies as $\sin^2 A$ where $A = 2 L/W$, L is the distance traveled by the resonator relative to the standing wave in the direction of wave propagation within the resonator, and W is the wavelength of the light used in the device. Spatial resolution is dependent upon the exact characteristics of the system components, but should be much less than $W/2$. The mixer 36 or similar detecting device provides an output which oscillates at a rate proportional to the relative velocity between the resonator and the standing wave. These oscillations are accumulated by an integrator 39, which may merely be a counter which counts each oscillation. The integrator 39 provides an output to a position display device 40, which displays relative position information. The output of the integrator 39 may also be applied to a differentiating circuit 42, the output of which may be delivered to a velocity display 44 to indicate the velocity of the resonator relative to the standing wave. The output of the differentiating circuit 42 may in turn be applied to a second differentiating circuit 48, whose output may be applied to an acceleration display 50 to indicate the acceleration of the resonator relative to the standing wave.

One limitation of the arrangement described above is that a frequency shift of the counterpropagating phase conjugated beams has been observed from the reference frame of the resonator. For very large frequency shifts, the efficiency of the phase conjugation process itself will be adversely affected. Efficiency drops significantly when the Doppler frequency shift is greater than about $10^9$ Hz. This does not occur, however, until a relative velocity of about $10^{-5}$ C (where C is the speed of light) is reached, so that frequency shifts for terrestrial vehicles should not result in a serious loss of efficiency.

Figure 6:
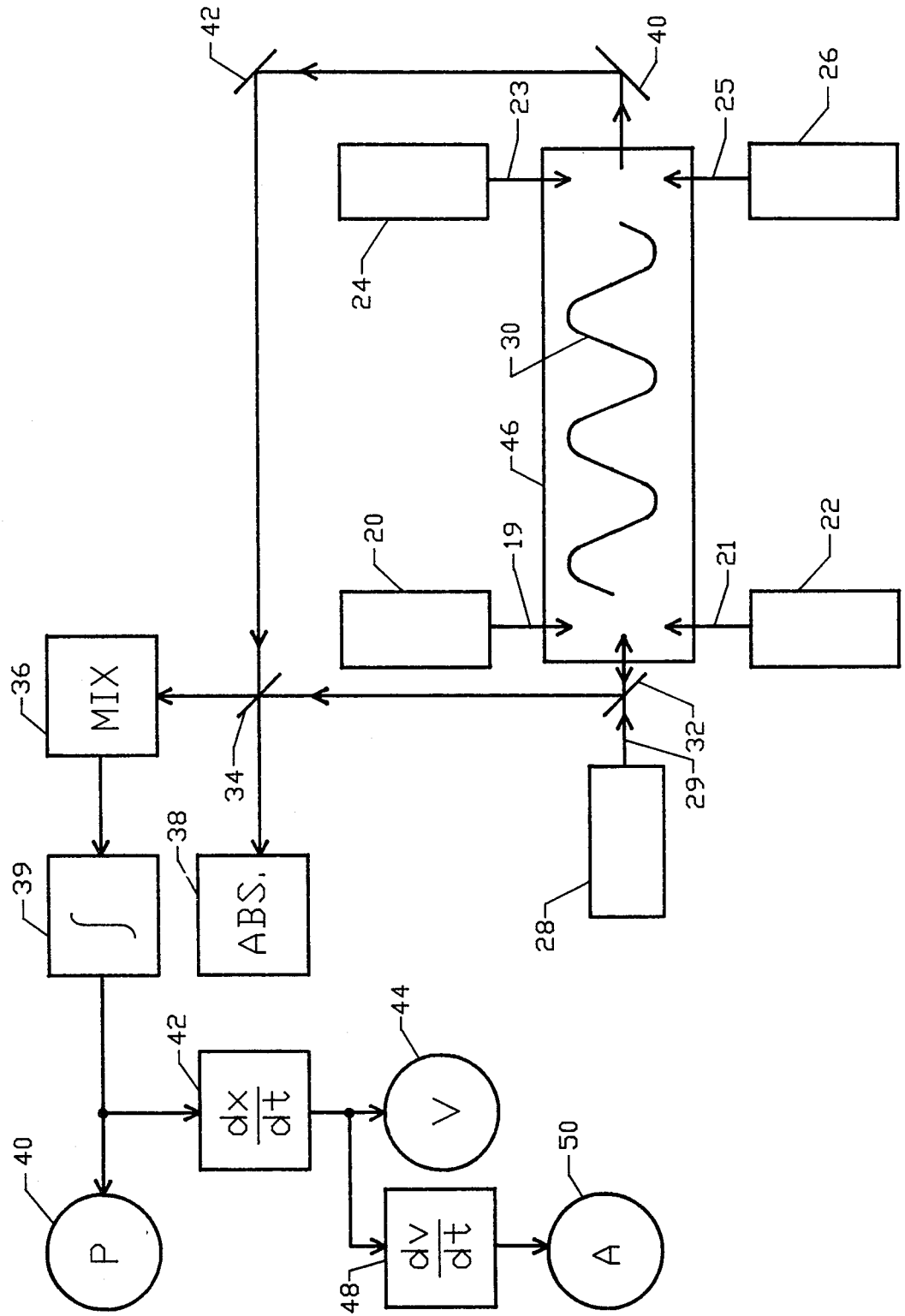
FIG. 6 is a schematic diagram of another embodiment of the invention in which the nonlinear medium within the four-wave mixers is coextensive with the medium between the mixers.

It is desirable that there be no localized loss mechanisms in the medium through which the standing wave is propagated. It has been theorized that the standing wave pattern would tend to lock with a node at the loss location. A second embodiment of the invention which avoids this potential problem is shown in FIG. 6. The system of FIG. 6 is the same as in FIG. 5, with the exception that the individual four-wave mixers 16 and 18 and the separate propagation medium between the two mixers have been replaced by a homogenous resonating cavity 46 in which there are no windows separating the phase conjugate mirrors from the propagating medium. Instead, the propagation medium is coextensive with the phase conjugation medium.

Other arrangements for detecting relative movement between the resonating cavity and the standing wave may also be used, including a measurement apparatus which monitors the intensity of the standing wave at any particular location fixed with respect to the resonating cavity, or an apparatus which detects changes in the phase of the standing wave either at the phase conjugate reflectors themselves or at any other fixed point within the resonating cavity.

It is expected that the relative position sensor of the present invention will be superior to current techniques of inertial navigation, since the distance traveled relative to an initial reference frame can be obtained directly. Velocity and acceleration may then be obtained by differentiation. Furthermore, with a position resolution comparable to interferometric techniques, applications of this invention in precision measurement apparatus may be feasible. In subterranean, submarine, or hostile environments in which the external propagation of laser radiation is not feasible, interferometric accurancies may be obtained with the self-contained relative position sensor of the present invention.

While specific embodiments of the invention have been shown and described, various modifications and alternative embodiments will occur to those skilled in the art. Accordingly, it is intended that the invention be limited only in terms of the appended claims.

We claim:

1. A phase conjugate relative position sensor, comprising:
    an optical resonator, including a pair of opposed phase conjugate reflectors;
    a source of electromagnetic energy for initiating a standing electromagnetic wave in said resonator; and
    a detector for measuring relative movement between said resonator and said standing wave.

2. The position sensor of claim 1, wherein said phase conjugate reflectors further comprise a first four wave mixer, including a first pair of contradirectional laser beams directed into a first nonlinear medium, and a second four wave mixer, including a second pair of contradirectional laser beams directed into a second nonlinear medium.

3. The sensor of claim 2, wherein said first nonlinear medium is coextensive with said second nonlinear medium and said nonlinear media extend throughout said resonator.

4. The sensor of claim 1, wherein said phase conjugate reflectors exhibit gains greater than one.

5. The sensor of claim 1, wherein said source of electromagnetic energy further comprises a laser.

6. The sensor of claim 5, wherein said detector further comprises:
    a mixer for combining a first sampled portion of said standing wave with a second sampled portion of said standing wave and measuring the combined intensity of said sampled portions; and
    an integrator for receiving the output of said mixer and accumulating said output to indicate relative movement between said resonator and said standing wave.

7. The sensor of claim 6, further comprising a differentiating circuit for differentiating the output of said integrator to measure relative velocity between said resonator and said standing wave.

8. The sensor of claim 7, wherein said differentiating circuit comprises a first differentiating circuit and further comprising a second differentiating circuit for differentiating the output of said first differentiating circuit to measure relative acceleration between said resonator and said standing wave.

9. A phase conjugate relative position sensor, comprising:
    an optical resonator, including:
        a first four wave mixer with a first pair of contradirectional laser beams directed into a first nonlinear medium,
        a second four wave mixer with a second pair of contradirectional laser beams directed into a second nonlinear medium, and
        a resonant cavity between said mixers, said mixers being positioned to act as opposed phase conjugate reflectors for said cavity;
    an initiating laser for initiating a standing electromagnetic wave in said resonant cavity; and
    a detector for measuring relative movement between said resonator and said standing wave.

10. The sensor of claim 9, wherein said detector further comprises:
    a mixer for combining a first sampled portion of said standing wave with a second sampled portion of said standing wave and measuring the combined intensity of said sampled portions; and
    an integrator for receiving the output of said mixer and accumulating said output to indicate relative movement between said resonator and said standing wave.

11. A phase conjugate relative position sensor, comprising:
    an optical resonator, including:
        a first four wave mixer with a first pair of contradirectional laser beams directed into a first nonlinear medium,
        a second four wave mixer with a second pair of contradirectional laser beams directed into a second nonlinear medium, said mixers exhibiting gains greater than one, and a resonant cavity between said mixers, said mixers being positioned to act as opposed phase conjugate reflectors for said cavity;

an initiating laser for initiating a standing electromagnetic wave in said resonant cavity; and a detector for measuring relative movement between said resonator and said standing wave, including:

a mixer for combining a first sampled portion of said standing wave with a second sampled portion of said standing wave and measuring the combined intensity of said sampled portions, and an integrator for receiving the output of said mixer and accumulating said output to indicate relative movement between said resonator and said standing wave.

12. A method of detecting movement relative to an inertial frame of reference, comprising the steps of:

providing an optical resonator with a pair of opposed phase conjugate reflectors;

initiating a standing electromagnetic wave in the resonator while the resonator is motionless relative to the reference frame; and measuring any subsequent relative movement between the resonator and the standing wave.

13. The method of claim 12, wherein the step of measuring relative movement further comprises the steps of:

combining a first sampled portion of the standing wave with a second sampled portion of the standing wave;

measuring the combined intensity of the sampled portions; and integrating the combined intensity measurement over time.

14. The method of claim 13, further comprising the step of differentiating the integrated measurement with respect to time to determine the relative velocity between the resonator and the standing wave.

15. The method of claim 14, further comprising the step of differentiating the relative velocity measurement with respect to time to determine the relative acceleration between the resonator and the standing wave.

* * * * *